Sept. 13, 1932.  R. S. BOWEN ET AL  1,876,845
MOTION PICTURE APPARATUS
Filed April 3, 1931   2 Sheets-Sheet 1
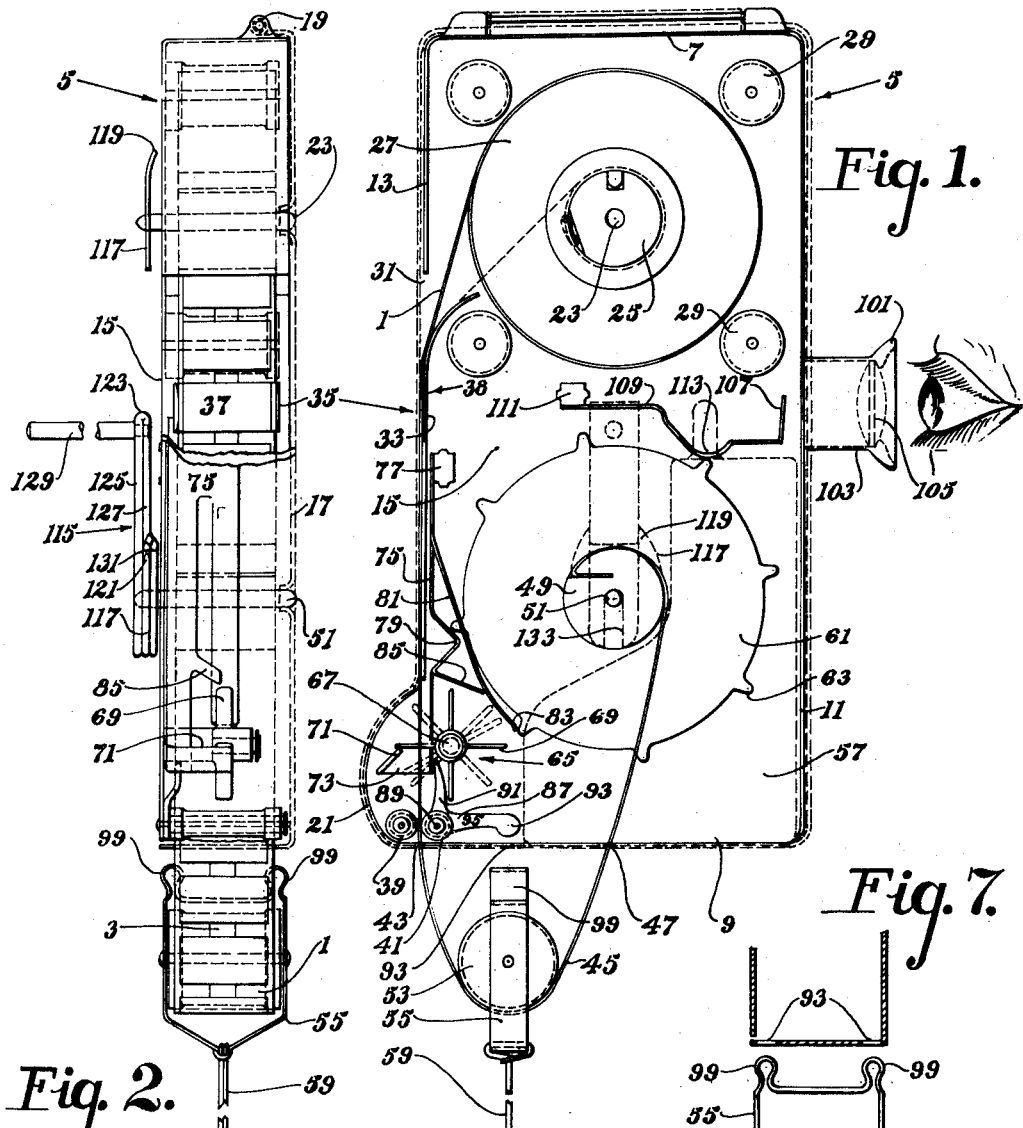
Fig. 1.
Fig. 7.
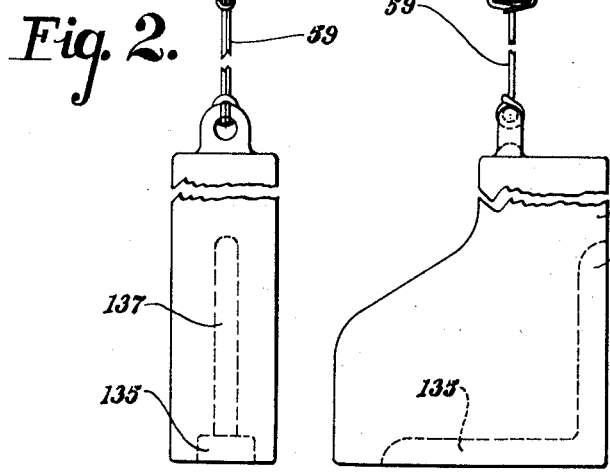
Fig. 2.
INVENTOR.
Robert S. Bowen,
BY J. Ellis Bowen,
Robert K. Randall.
ATTORNEY.

Sept. 13, 1932.  R. S. BOWEN ET AL  1,876,845
MOTION PICTURE APPARATUS
Filed April 3, 1931  2 Sheets-Sheet 2
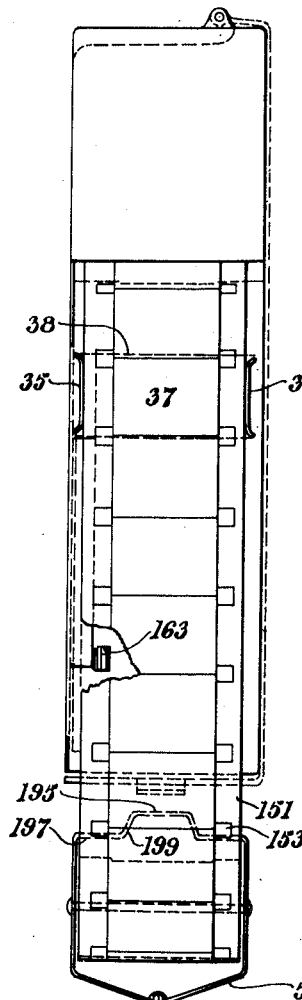
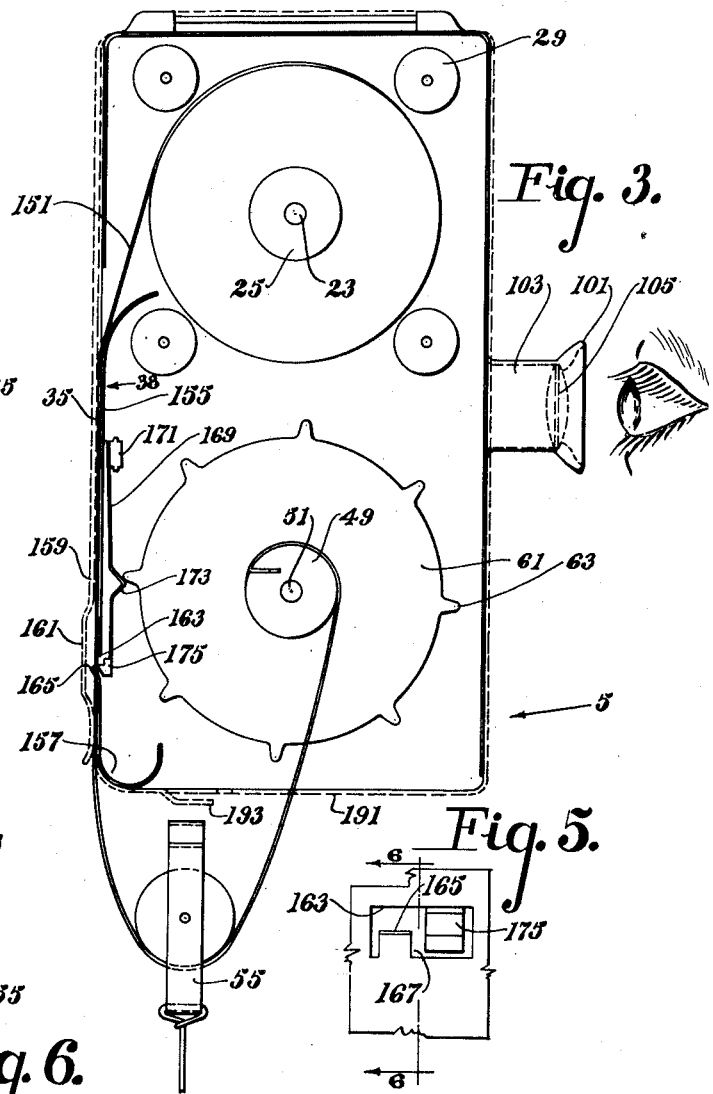
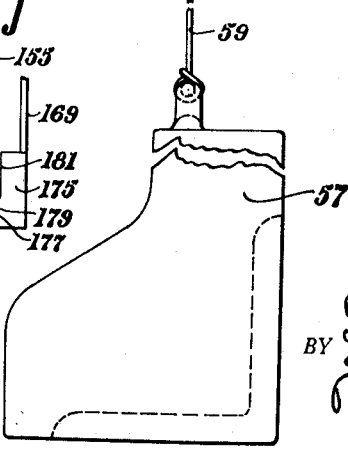
INVENTOR.
Robert S. Bowen,
BY J. Ellis Bowen,
Robert K. Randall.
ATTORNEY.

Patented Sept. 13, 1932

1,876,845

UNITED STATES PATENT OFFICE

ROBERT S. BOWEN AND JOHN ELLIS BOWEN, OF WEST NEWTON, MASSACHUSETTS

MOTION PICTURE APPARATUS

Application filed April 3, 1931. Serial No. 527,440.

The invention relates to motion picture apparatus intended primarily for convenient individual observation of film strips with "motion" effect, or of any one or more of the pictures as a "still" picture, although features of the film-feeding and other parts of the mechanism are or may be also adapted or adaptable to moving picture cameras or projectors.

For the principal purpose or use above mentioned, the invention aims to provide a very small, compact, simple and inexpensive apparatus, which may be held in one hand, with its light-aperture directed to any available light source (daylight, an electric bulb, etc.) and easily and conveniently manipulated for observation of the "action" of the film strip, or of the individual pictures as "stills"; to arrange or adapt the mechanism in one form for the use of narrow film, including that of the smallest and least expensive commercial size, having a picture width of nine millimeters and/or having feed-holes at the strip-center between the pictures, and in another form, for use of wider, or standard-width film, having the feed or drive-holes at the margins; and to compensate in a simple way for the varying diameters of the film-rolls on the supply and wind-up reels or spools, and consequent variation of relative length of film being delivered and rewound.

A principal feature of the invention structures is novel and improved film-driving or feeding means, including a weighted roll which maintains a film-loop of varying length between the supply and take-up reels, and particularly between the stop or intermittent-feed mechanism and the take-up reel; another feature is an improved and simplified intermittent "motion" (escapement or feed-means) adapted in one form to cooperate with the centrally located feed-holes, or in another form, to cooperate with marginal holes, at either or both sides of a film-strip.

In the drawings,—

Fig. 1 is a side and sectional elevation of a film-exhibiting apparatus embodying the invention in one form.

Fig. 2 is an elevation at the left of Fig. 1, with some parts broken away.

Fig. 3 is a view similar to Fig. 1, of a modified improvement.

Fig. 4 is a left-side elevation of Fig. 3, with some parts broken away.

Fig. 5 is a front elevation, enlarged, of the fixed detent means of Figs. 3 and 4.

Fig. 6 is a vertical section at 6, 6, Fig. 5, showing also the movable detent.

Fig. 7 is a sectional detail, enlarged, showing the means for detachably securing the loop-pulley-yoke to the case, in the structure of Figs. 1 and 2.

Figs. 1 and 2 show the apparatus designed to use very narrow film 1 (about 6 millimeters wide) having feed or drive apertures 3 at the center line, between the picture-areas. The film referred to is actually narrower than that shown in the drawings, the width being somewhat exaggerated for illustrative clearness.

The case 5, usually of sheet metal, has very narrow top, bottom, front and back walls 7, 9, 11, and 13, respectively, and opposite side-walls 15, 17. The thickness of the case, as indicated by the width of walls 7, 9, etc. is very small, being only slightly greater than the width of the film, and the side-face dimensions are also small, so that the appliance is very compact and well adapted for pocket carrying; and an important feature of the invention is the adaptation or arrangement of the operating mechanism to be contained in this small compass.

One side-wall 17 is hingedly connected as at 19, forming a movable cover, whose front, rear and bottom walls may overlap the corresponding walls of the case-body.

To accommodate parts of the escapement, and a film-guide roll, the rear wall of the case may have a bulge, or pocket formation 21.

A pintle, or shaft 23 is revolubly mounted in a bearing on the fixed side-wall 15, near the upper end of the case. A spool or reel 25 is removably placed on and connected to rotate with pintle 23. The film-supply, in a roll 27, is carried by or slipped over spool 25. The film-roll may be additionally confined or guided by revoluble rolls 29. From this supply roll the film is directed downward to and through an aperture, or slot 31 and over a guide-surface 33, which may be the rear wall of the case-body, and which has a light-aperture 38 of a size corresponding to one film-picture-area, and is represented as being thus exactly covered by such a picture 37. Side-guides 35 serve to keep the pictures laterally in register with the view or light-aperture. From the light-aperture the film passes over the exterior of the back wall portion 33, past the escapement or feed-controlling means (presently described), and between guide-rolls 39, 41, to and through a slot 43 in the bottom wall 9, and assumes the form of a dependent loop 45, exterior to the case; from the loop an ascending stretch of the film runs to and through another slot 47, to a take-up spool 49, which may be fixedly or detachably mounted on and to turn with a driving or controlling shaft or pintle 51, revolubly mounted in a bearing on wall 15.

A roller or pulley 53 rests in or on the film-loop 45; the pulley is revolubly mounted in a yoke or pulley-frame 55 (usually of spring sheet metal) through a lower part of which the film passes. A weight 57 is suspended from the pulley-yoke by elastic means such as a rubber band or strip 59. The weight acts as a motor element, while the elastic band has a vibration absorbing or eliminating function, as will appear.

Fixed on shafts 51 close to the interior surface of wall 15 is a circular controlling disk or plate 61 having spaced peripheral lobes or lugs 63. A rotary film-engaging and controlling, or escapement, member 65 is revolubly mounted on a shaft 67 fixed in the wall 15, and is located in the present example, adjacent disk 61 and near the bottom and rear wall of the case, extending out into the bulge 21. This member has a suitable number of spaced radial arms, or elongated teeth, 69, located in the central plane of the case, to engage in the film-holes 3, to control film-feed without engagement with the film surface. A detent 71 cooperates with the teeth 69 within the bulge 21. This detent is a laterally bent or offset portion of a rearwardly-directed part 73 at the end of an escapement-spring 75, the upper end of which is secured to a support 77 fixed in the case. This escapement-spring is bent to provide a cam-like portion 79 adapted to engage the periphery of the feed-disk 61 and to cooperate with its lobes 63, to periodically retract the detent 71 rearwardly, as further explained below. Another, or secondary detent-member 81, which may also be in the form of a strip-spring (or may actually be, as shown, an integral part of the spring metal sheet of which spring 75 is also a part) is anchored to the support 77, and its lower end 83 located in the plane of the escapement-teeth 69 is adapted to engage, at times, and stop, these teeth at the right of the escapement wheel axis 67, Fig. 1. Normally this detent-end of spring 81 is held in a forwardly-retracted position, clear of the teeth, as shown, by a laterally and forwardly offset extension 85 from the primary detent-spring 75.

An eye-piece 101 is mounted in the front wall 11, or on a tube 103 fixed thereon, at an aperture therein, in line with the light-aperture 38 above-mentioned, and a suitable lens, or lens-group 105, preferably of the inverting type, is mounted in the tube, adjacent the eye-piece.

In intermittent film-feeding apparatus, a shutter is customarily employed to cut off light during film movement; such a shutter is sometimes unnecessary for present purposes, but may be provided, if necessary or desirable, as shown in Fig. 1, in which the shutter 107 is supported relatively near the lens by a movable arm or spring-strip 109, connected to wall 15 by a piece 111. The spring-strip has a curved or cam-portion 113 cooperating with the periphery of disk 61 and with its lobes 63, one of which acts on the cam-portion 113 to raise the shutter into the light-path and retain it in that position, obscuring the film while the latter is moving, as will appear.

The cam-portion 113 also acts as an additional yielding detent, or retarder, for disk 61 and film-spool 49, effective principally during rewinding.

For film viewing, shaft or pintle 51 is rotated by a crank 115 applied to the end of the pintle 51 projecting outward from case-wall 15. For convenience in carrying the apparatus, and also to enable the same crank to be used for rewinding by applying it to pintle 23, provision is desirably made for ready application and removal of the crank with respect to both pintles.

Thus, as shown, each pintle has on its protruding end, a plate 117 formed with spaced, laterally bent or offset prongs 119, and a beveled edge 121 therebetween, as shown in section in connection with the lower pintle 51 of Fig. 2. The crank 115 is conveniently formed of a piece of spring metal, folded at 123, thus providing two resiliently-connected crank-arms or plates 125 and 127. The end-portion of one of these (at the end remote from the handle 129) is formed with an offset, or bend 131, thus spacing apart the end-portions of the two arms; and the offset end also has a slot 133 to accommodate or straddle the pintle, as sufficiently shown in dotted lines in Fig. 1. The crank-end is easily slipped over either disk 117 (by entry of its beveled edge 121 between the crank-arms) and is resiliently or frictionally retained in place, and rotative connection is effected by engagement of the prongs 119 at opposite sides of the offset-bend 131 of the inner crank-arm or portion 127.

To view the film, it is threaded from the film-roll or coil on spool 25 in the manner clearly indicated in Fig. 1, one of the film-apertures 3 being placed over a rearwardly-directed one of the escapement teeth 69. Pulley 53 with its attached weight 57 is placed in a loop 45 and the end of the film threaded through slot 47 and wedged in a slit in the hub or spool 49. The rearward escapement-tooth 69 resting on detent 71 supports the down-stretch of film leading to pulley 53, while downward movement of the film-stretch leading to spool 49 is prevented by the cam-portion 113 of spring-arm 109 engaging one of the disk-lobes 63.

The case is held in one hand with the light-aperture at 38 directed toward any convenient light-source; the eye-piece may be positioned at a variable distance from the eye (as indicated in Fig. 1) for proper focusing through the lens, or focusing means may be provided if desired, as by moving the eye-piece relatively to its tube 103.

Crank 115 (now located on pintle 51) is turned, to rotate the pintle 51, spool 49, and disk 61 counter-clockwise, as viewed in Fig. 1. Disk-lobe 63 next adjacent cam 79 acts on the cam to move spring 75 and retract detent 71 (to the left) from under the rearward escapement tooth 69, and simultaneously an upwardly-located lobe 63 next adjacent cam-member 113 of spring 109 acts thereon to raise shutter 107 into the line of vision, obscuring the film during its feed-movement. The outward movement of spring 75 relaxes pressure of its extension 85 on spring 81, which also moves outward bringing its detent-end 83 into the path of the forward, rising tooth 69 of the escapement wheel, as, or slightly before, the detent 71 is withdrawn from the opposite tooth, as just above mentioned. The gravity-force of weight 57 acting on film-loop 45 pulls the film downward, rotating the escapement-wheel 65 slightly, until stopped by engagement of its right-hand tooth with detent 83; the disk-lobe acting on cam-member 79 passes beyond the cam, permitting spring 75 to move toward active position (toward the right); the left-most escapement-tooth 69 has passed below the upper end of the angular detent-member 71; spring-extension 85 moves spring 81 also to the right, so that its detent end 83 is withdrawn from the right-hand escapement-tooth; the escapement-wheel 65 is now free, and under pull on the down-stretch of the film exerted by the weight, the film is advanced one picture-length, bringing the next picture opposite the light-aperture 38. At this moment the next tooth 69, which has entered the next upward film-hole, engages detent 71, stopping the film in the stated position; just before the film is stopped, the disk-lobe 63 which has been in engagement with cam-member 113 passes away from it, and spring 109 moves the shutter down, out of the light path, disclosing the picture for observation. These operations are repeated as the crank is turned, natural "motion" effect being obtained when it is turned at a normal speed, corresponding approximately to sixteen pictures per second; or by slower turning the "action" may be slowed as desired, or "stopped" by cessation of turning, to observe any single picture, or successive pictures, as "stills", as for the purpose of analyzing momentary positions of any moving "subject".

In starting, with a film-roll of maximum (permissible) diameter on the supply-spool 25, and with the take-up spool 49 empty, (and therefore of minimum diameter), the length of film taken up by spool 49 is less than that drawn from spool 25; the film-loop 45, which may be relatively short at starting, about as shown in Fig. 1, is thus increased progressively until the film-roll diameters on the two spools are equalized; thereafter, the length taken up on spool 49 in relation to that drawn from spool 25 is increased, with progressive shortening of the weight-controlled loop until finally, when the film is nearly all wound on the take-up spool 49, the loop is again of minimum length, with pulley 53 and its yoke 55 drawn close up to the bottom of the case.

The weight 57 acts as a film-driving motive-force, additional to and to a certain extent independent of, the crank and take-up spool 49; the use of an external weight-controlled loop also permits dispensing with a beater-loop and corresponding mechanism commonly employed in film-feed apparatus, and enables the feed or escapement mechanism to be greatly simplified, and to be contained in small space for present or other purposes; and by "compensating" for the relatively-changing diameters of the supply and take-up rolls, dispenses with frictional or other more complicated spool driving mechanism.

It will now be understood that the spacing of the lobes on disk 61 may be varied considerably. This spacing determines, primarily, the number of picture presentations per revolution of the disk, and the arcuate distance between lobes need not correspond to film-picture length (or distance between feed-holes 3). The use of a weighted loop of variable length compensates for any reasonable difference between the length of film passing the light-aperture, and that taken up on spool 49, in unit time.

The rubber strip 59, or other resilient connection of weight 57 to the pulley-yoke 55 serves to advance the film the instant the detent permits film-advance, without waiting for gravity to overcome the weight's inertia, and also acts in effect as a "shock-absorber", preventing abrupt jerking or breakage of the film as it is checked by the detents, and "damping out", or preventing communication of vibratory effects to the weight, or from the weight back to the film and the whole case. The resilient connection is thus an all-important feature of the feed-devices.

For retracting and maintaining detent 71 in retracted position during film-rewinding (on spool 25), a crank-lever 87 is pivotally mounted, as on shaft 89 of guide-roll 41, near the case bottom, and has one arm 91 opposed to a lower-end portion of the detent-spring 75, while the end 93 of its other arm 95 is adjacent the bottom wall 9, at or above an aperture 93 therein. This aperture and another similar aperture are designed to receive yieldable or "spring" lobes or loops 99 formed in the upper portion of pulley-yoke 55. To support the yoke in an idle position at the bottom of the case, and at the same time to facilitate film rewinding, the yoke lobes 99 are pressed into the apertures 93, whereupon they re-expand and retain the yoke removably in the stated position. In the act of insertion, one of the lobes engages the end 93 of lever arm 95 and turns the lever counter-clockwise, (as viewed in Fig. 1) whereupon its arm 91 acts on the detent-spring 75 to retract detent 71 from the path of teeth 69, thus avoiding noise and resistance which would otherwise be caused by rotation of the detent-wheel in engagement with the pawl, or detent 71, during rewinding, and avoiding putting an unnecessary and harmful strain on the film tending to tear it adjacent the holes 3.

To rewind the film the crank is applied to pintle 23 and turned clockwise. Preferably at this time the pulley-yoke is attached to the case-bottom, retracting detent 71 in a manner sufficiently explained above, and eliminating ratcheting noise which would otherwise be caused by engagement of the detent with teeth 69 during rewinding. The film is thus drawn from the spool 49, passing under pulley 53 which is now in fixed position at the case-bottom, and rewound on spool 25, detent-wheel 65 turning idly in the reverse direction, with its tooth-ends sliding past the end 83 of detent-spring 81, which has a light pressure-value, and occasions no objectionable noise by this wiping contact. Spring 109 and its cam portion 113 during rewinding, have a light drag and film-tensioning action, by engagement with the periphery of disk 61, and prevent "overrunning" of spool 49, or reverse movement if winding force is relaxed.

A detail feature of importance is provision for compact association of the crank with the weight, when not in use. As shown in Figs. 1 and 2 the weight has on adjacent faces, socket or channel-formations 135 and 137 respectively receiving the arm and handle-portions of the crank when detached from the pintles. The crank is thus "packed" within the area of the weight. The weight and handle may then be packed in the lower portion of the case as indicated in dotted lines, Fig. 1.

Figs. 3 to 5 show another embodiment of the invention, including a simpler form of "escapement" mechanism, and adapted for the use of film 151 having marginal slots or feed-holes 153. This film is usually wider than that which has central holes, as above described, although it is often narrower than that used in commercial projectors. The case thickness in this instance is somewhat greater than in the previously example, but need be only slightly greater than the film width.

The film guide-surface 155 formed of the rear wall and having light-aperture 38 and guide-clips 35 as before, has at its lower end a curved formation 157, dispensing with a guide-pulley such as 39 of Fig. 1. The adjacent cover-flange 159, as indicated in dotted lines in Fig. 3, or a separate spring-strip, has a slight protuberance 161 to accommodate escapement elements. Above and below the protuberance, the flange or strip 159 holds the film closely against the inner guide-strip or surface 155. The escapement-mechanism may be provided in duplicate, to cooperate with both marginal rows of holes 153; it is sufficient to describe one such "escapement" as here shown. The rear case wall 157 has, near one side, confronting the feed-holes 153 at one margin of the film, an aperture 163, at the lower end of which the wall-material is bent outward to form a shallow shoulder, or fixed film-detent-teeth 165, between which is a central slot 167 (Fig. 5). A single movable detent-spring 169 is fixedly supported at 171, and has a cam-formation 173 cooperating with control disk 61 and its lobes 63. At the lower end of this spring is a head 175, formed with a lug or tooth 177 having a horizontal upper face or shoulder 179 at the bottom of a short vertical face 181, which is set outward (rearwardly) from the spring. This head is dimensioned to enter aperture 163, and spring 169 is biased to normally retract the head (forward, or to the right in Fig. 3). The head is also of such thickness that it will enter the slot 167 of fixed detent-tooth 165. The film-loop and weight arrangements, as well as all other needed parts, are substantially as in the previous example.

In an initial position of the parts, as shown in Fig. 3, head 175 is retracted, and the fixed detent-tooth 165 is in one of the film-holes 153, the upper edge of which rests on the upper tooth-face, retaining the film in stationary position with a picture-area located at the light-aperture 38, against the pull of weight 57 which tensions the film and causes it to tend to lie flat against the guide-face 155. The take-up pintle 51 being rotated (as previously), a disk-lobe 63 engages cam 173 and moves head 175 outward, so that its tooth 177 enters the film-hole, horizontal shoulder 179 being then slightly below the upper hole-edge. Vertical face on shoulder 181 then engages the film surface at and just above the upper hole-edge, and pushes the film slightly rearwardly, until the hole-edge is freed from the fixed detents 165, and moves slightly downward, engaging the horizontal detent-shoulder 179 of head 175, which momentarily supports the film, until lobe 63 passes away from the crest of cam 173, whereupon the spring acts to retract head 175, freeing the film, which rapidly moves downward one picture-length, under urgency of the weight. In this movement the film margin (in the line of the holes) is yieldingly held in light contact with the outer edge, or face, of the fixed detents 165, and as soon as the next hole comes opposite the detent, the film straightens and moves slightly forward, into contact with the guide-surface 155, the detent-tooth 165 being thus caused to enter the hole, and immediately thereafter the upper hole-edge engages the upper tooth-faces which again checks the film in picture-registering position.

Figs. 3 and 4 also show modified means for supporting the pulley-frame or yoke 55 in (detachably) fixed position on the case. The lower cover-flange 191 is cut and bent to form a spring-clip 193 to receive an upper, central portion 195 of the top member 197 of the pulley-frame, this top member being bent to form shoulders 199 at the ends of the clip-engaging portion 195, to "center" the yoke in proper position below the case.

While we have illustrated and described certain forms in which the invention may be embodied, we are aware that many modifications may be made therein by any person skilled in the art, without departing from the scope of the invention as expressed in the claims. Therefore, we do not wish to be limited to the particular forms shown, or to the details of construction thereof, but what we do claim is:—

1. Film-exhibiting apparatus comprising a supply-spool, a take-up spool, intermittent film-escapement mechanism, a pulley adapted to run in a film-loop intermediate the spools, a weight, and elastic inertia- and vibration-absorbing means suspending the weight from the pulley.

2. Film-exhibiting apparatus comprising a supply-spool, a take-up spool, intermittent film-escapement mechanism, a weighted pulley adapted to run in a film-loop intermediate the spools, and means for rotating the take-up spool, whereby the film is advanced by cooperative action of the weight and take-up spool under control of the escapement mechanism.

3. Film-exhibiting apparatus comprising a case, film-spools and escapement mechanism in the case, said mechanism including a rotary toothed element and a detent, a weight holder normally suspended from an external film-loop, means for detachably connecting the weight holder to the case, and means operated by such connection of the weight holder to retract the detent, avoiding resistance and noise during film rewinding.

In testimony whereof we affix our signatures.

ROBERT S. BOWEN.
J. ELLIS BOWEN.